US00RE45055E

(19) United States
(12) Reissued Patent
Roth et al.

(10) Patent Number: US RE45,055 E
(45) Date of Reissued Patent: Aug. 5, 2014

(54) CONTAINER

(75) Inventors: Donna Roth, Duxbury, MA (US); Henry Roth, Plymouth, MA (US)

(73) Assignee: Cool Gear International, LLC, Plymouth, MA (US)

(21) Appl. No.: 29/397,455

(22) Filed: Jul. 15, 2011

Related U.S. Patent Documents

Reissue of:
(64) Patent No.: Des. 634,161
Issued: Mar. 15, 2011
Appl. No.: 29/375,752
Filed: Sep. 27, 2010

U.S. Applications:
(62) Division of application No. 29/335,720, filed on Apr. 20, 2009, now Pat. No. Des. 624,361.

(51) LOC (10) Cl. ..... 07-01
(52) U.S. Cl.
USPC ..... D7/510; D7/511; D7/392.1
(58) Field of Classification Search
USPC ..... D7/392.1, 396.2, 392, 507, 509, 510, D7/511; D9/443, 445, 447
See application file for complete search history.

(56) References Cited

U.S. PATENT DOCUMENTS 1,657,927 A 1/1928 Heinzen
2,187,558 A 1/1940 Kushima (Continued)

*Primary Examiner* — Phillip S Hyder
(74) *Attorney, Agent, or Firm* — Edwards Wildman Palmer LLP; Steven M. Jensen

(57) CLAIM

The ornamental design for a container, as shown and described.

DESCRIPTION

FIG. 1 is a perspective view of a container showing our new design;
FIG. 2 is front elevational view of the container of FIG. 1;
FIG. 3 is a rear elevational view of the container of FIG. 1;
FIG. 4 is a left side elevational view of the container of FIG. 1; the right side elevational view of the container of FIG. 1 being a mirror image of FIG. 4;
FIG. 5 is a top plan view of the container of FIG. 1;
FIG. 6 is a bottom plan view of the container of FIG. 1;
FIG. 7 is a perspective view of a container showing a second embodiment of our new design;
FIG. 8 is front elevational view of the container of FIG. 7;
FIG. 9 is a rear elevational view of the container of FIG. 7;
FIG. 10 is a left side elevational view of the container of FIG. 7; the right side elevational view of the container of FIG. 7 being a mirror image of FIG. 10;
FIG. 11 is a top plan view of the container of FIG. 7; and,
FIG. 12 is a bottom plan view of the container of FIG. 7.
*FIG. 13 is a perspective view of a container showing a third embodiment of our new design;*
*FIG. 14 is a front elevational view of the container of FIG. 13;*
*FIG. 15 is a rear elevational view of the container of FIG. 13;*
*FIG. 16 is a left side elevational view of the container of FIG. 13, the right side elevational view of the container of FIG. 13 being a mirror image of FIG. 16;*
*FIG. 17 is a top plan view of the container of FIG. 13; and,*
*FIG. 18 is a bottom plan view of the container of FIG. 13.*
The broken lines in FIGS. 1-12 represent environment and are for illustrative purposes only and do not constitute part of the claimed design.

1 Claim, 9 Drawing Sheets

Figure 1:
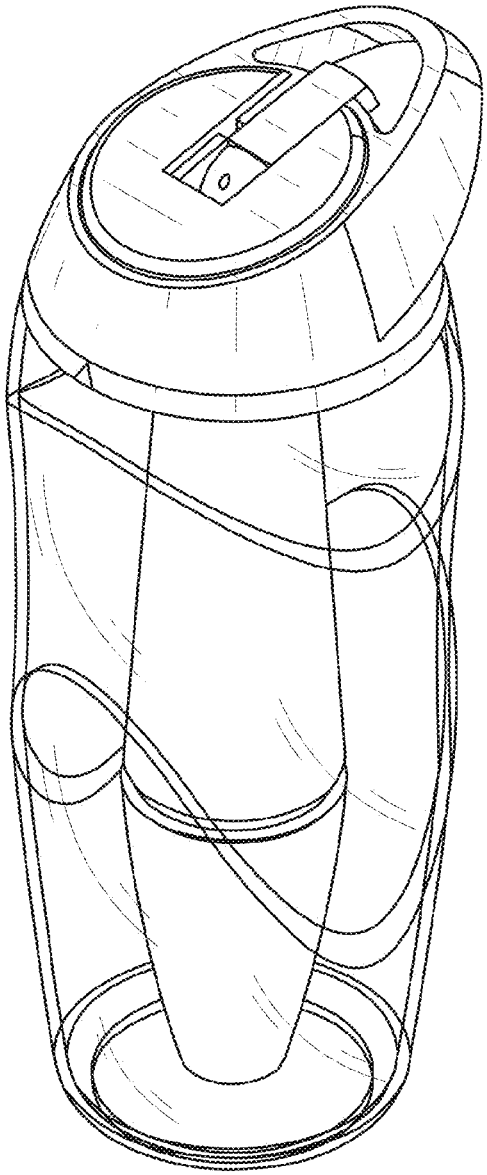
Figure 2:
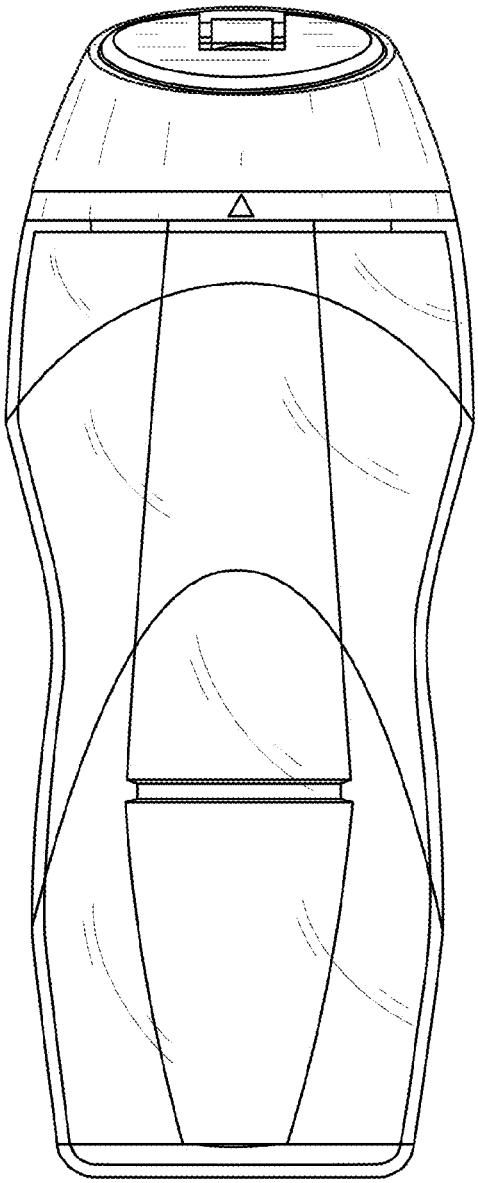
Figure 3:
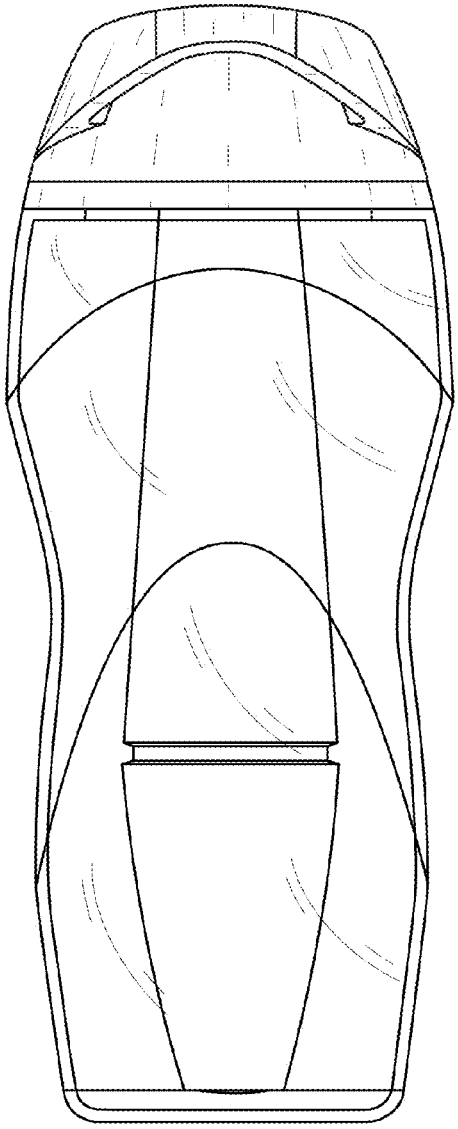
Figure 4:
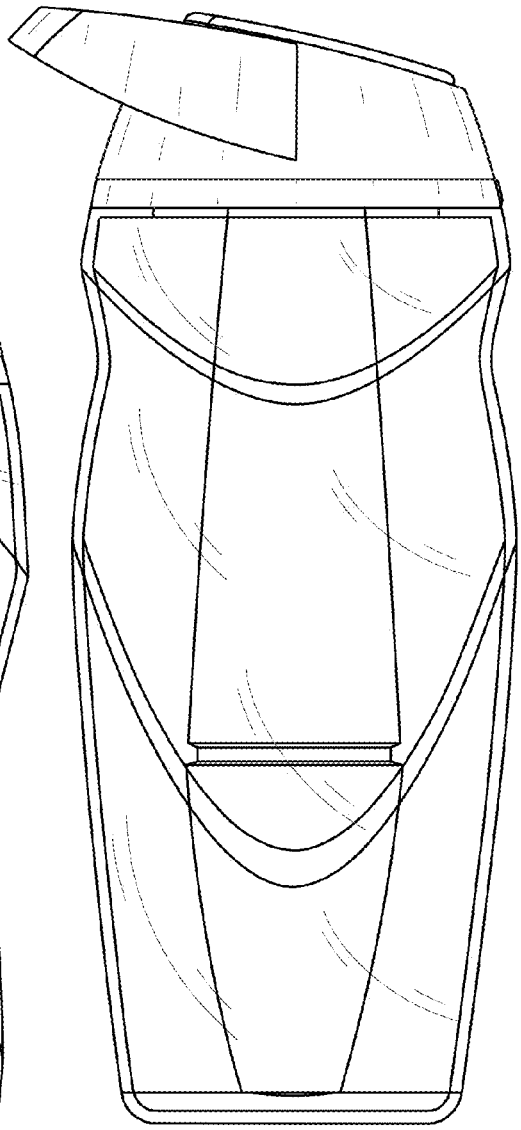
Figure 5:
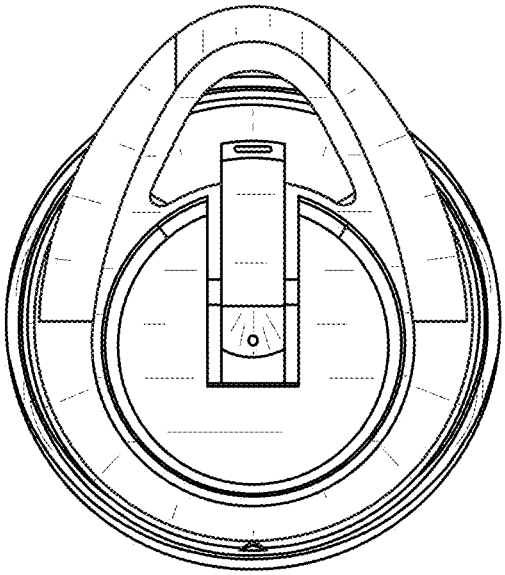
Figure 6:
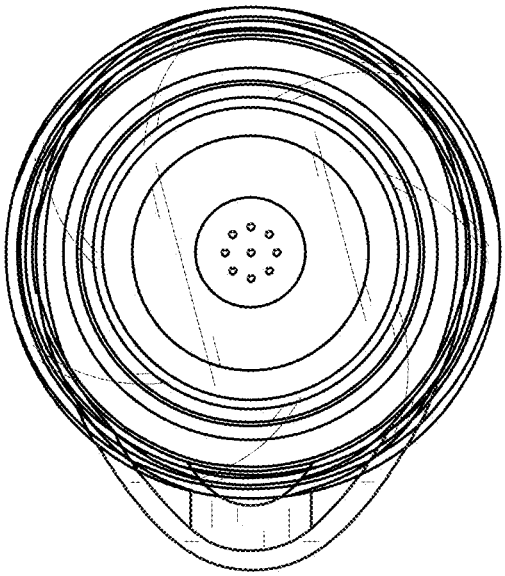
Figure 7:
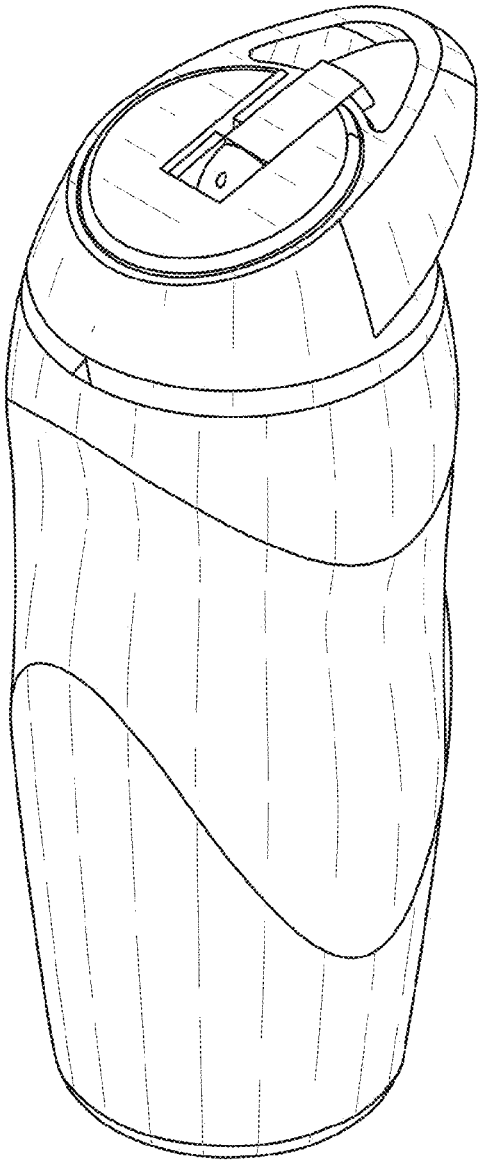
Figure 8:
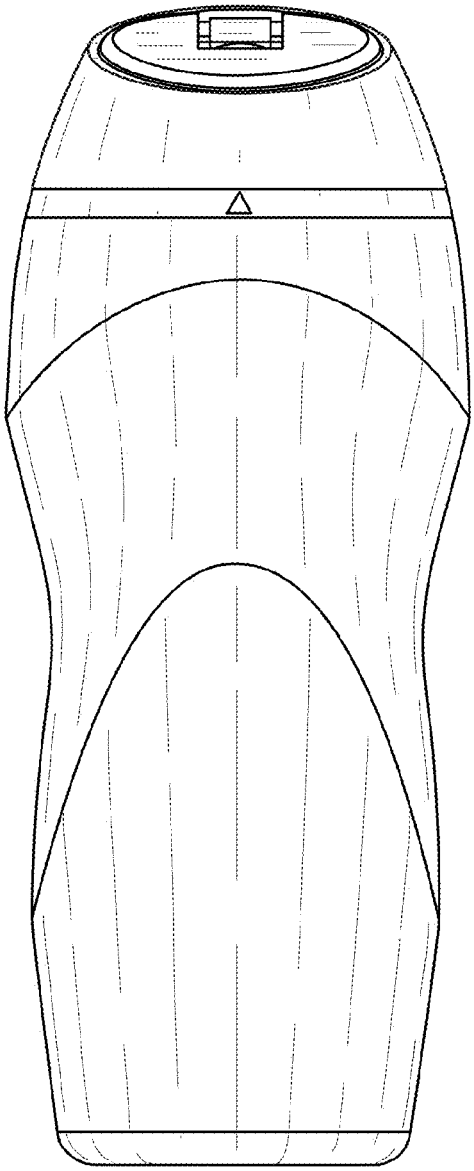
Figure 9:
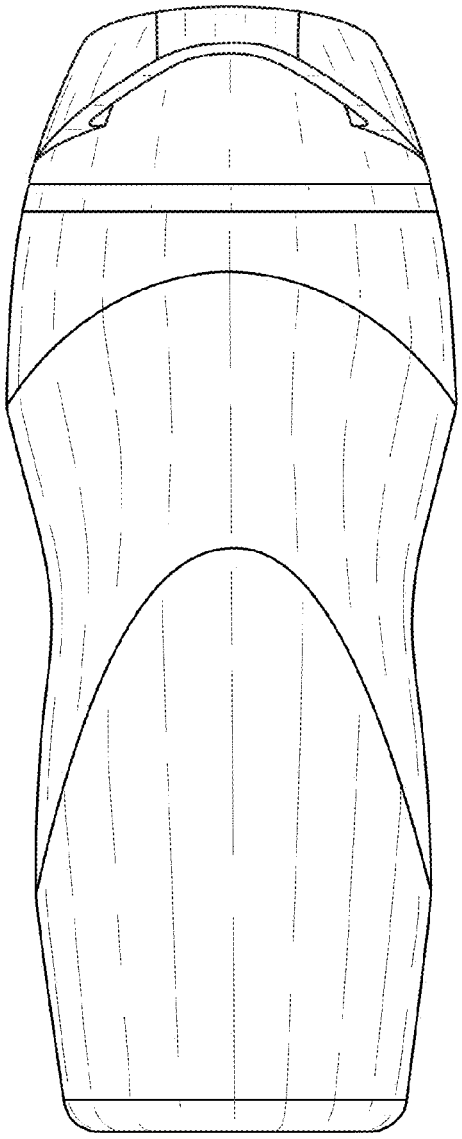
Figure 10:
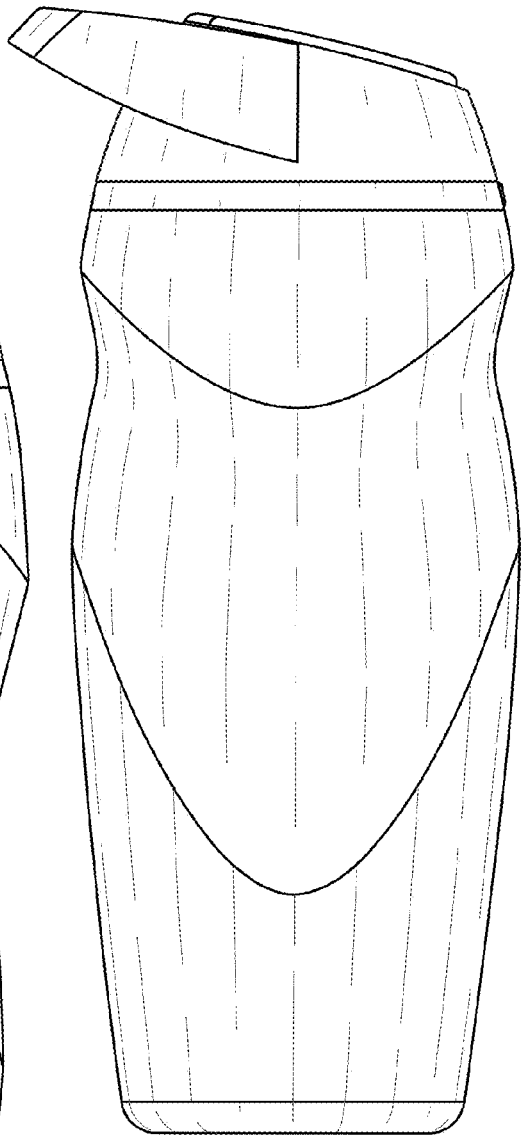
Figure 11:
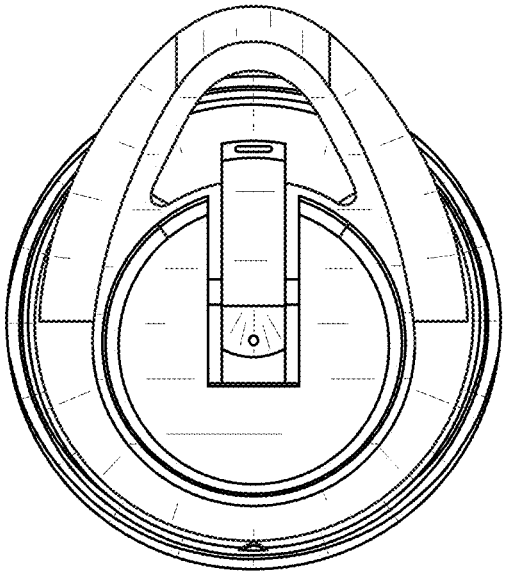
Figure 12:
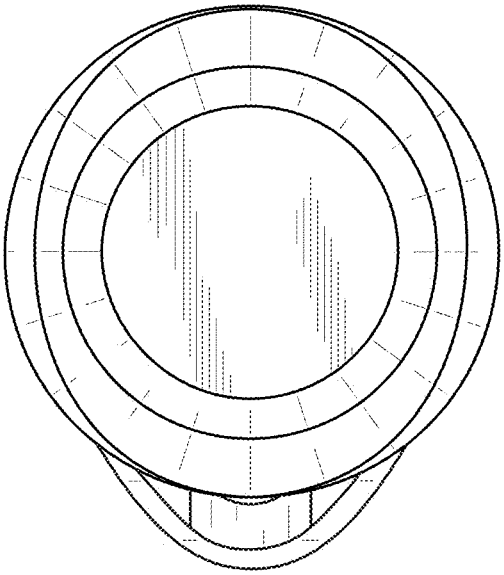

Matter enclosed in heavy brackets [ ] appears in the original patent but forms no part of this reissue; matter printed in italics indicates the additions made by reissue.

(New)

(56) References Cited

U.S. PATENT DOCUMENTS

| | | | | | |
|---|---|---|---|---|---|
| 4,410,085 | A | | 10/1983 | Beneziat et al. | |
| 4,981,022 | A | | 1/1991 | Snyder | |
| 5,456,090 | A | | 10/1995 | McCoy | |
| 5,467,877 | A | | 11/1995 | Smith | |
| 5,472,274 | A | | 12/1995 | Baillie | |
| 5,487,486 | A | | 1/1996 | Meneo | |
| 5,590,542 | A | | 1/1997 | Wang | |
| 5,609,039 | A | | 3/1997 | Green et al. | |
| 6,276,560 | B1 | * | 8/2001 | Belcastro | 220/709 |
| D447,693 | S | * | 9/2001 | Warner et al. | D9/776 |
| D458,086 | S | | 6/2002 | Marks et al. | |
| D464,849 | S | * | 10/2002 | Norris et al. | D7/523 |
| D467,122 | S | * | 12/2002 | Janky | D7/510 |
| D477,183 | S | * | 7/2003 | Janky | D7/509 |
| D478,511 | S | | 8/2003 | Reynolds | |
| D478,779 | S | * | 8/2003 | Stamper et al. | D7/510 |
| D486,996 | S | * | 2/2004 | Karp | D7/510 |
| 6,751,982 | B2 | | 6/2004 | Horen | |
| D499,608 | S | * | 12/2004 | Cintron et al. | D7/510 |
| D502,844 | S | * | 3/2005 | Rohe | D7/510 |
| D518,335 | S | * | 4/2006 | Naft et al. | D7/608 |
| D523,692 | S | * | 6/2006 | Meehan | D7/507 |
| 7,073,678 | B1 | * | 7/2006 | Dibdin et al. | 220/254.1 |
| D528,862 | S | * | 9/2006 | Li | D7/510 |
| D530,980 | S | * | 10/2006 | Zerillo et al. | D7/509 |
| D531,445 | S | | 11/2006 | Bodum | |
| D538,597 | S | * | 3/2007 | Kim | D7/510 |
| 7,185,782 | B2 | | 3/2007 | Vilchez, Jr. et al. | |
| D542,599 | S | * | 5/2007 | Tien | D7/523 |
| D543,776 | S | * | 6/2007 | Yelland | D7/392.1 |
| D545,623 | S | | 7/2007 | Renz et al. | |
| D546,625 | S | * | 7/2007 | Gluck | D7/523 |
| D547,607 | S | * | 7/2007 | Forsman | D7/396.2 |
| D552,421 | S | | 10/2007 | Wolf | |
| D554,433 | S | * | 11/2007 | Gluck | D7/523 |
| D562,076 | S | * | 2/2008 | Sandberg | D7/533 |
| D566,468 | S | * | 4/2008 | Sandy | D7/510 |
| D569,182 | S | * | 5/2008 | Homma | D7/510 |
| D569,187 | S | * | 5/2008 | Sandberg | D7/523 |
| D573,404 | S | | 7/2008 | Wahl | |
| D575,987 | S | | 9/2008 | Williams | |
| D577,958 | S | | 10/2008 | Homma | |
| D577,959 | S | | 10/2008 | Sandberg | |
| D586,184 | S | * | 2/2009 | Miller et al. | D7/511 |
| D589,750 | S | | 4/2009 | Liu et al. | |
| D592,456 | S | | 5/2009 | Pinelli et al. | |
| D592,905 | S | * | 5/2009 | Pinelli et al. | D7/396.2 |
| D592,913 | S | | 5/2009 | Pinelli et al. | |
| 7,533,783 | B2 | * | 5/2009 | Choi et al. | 220/714 |
| D600,071 | S | | 9/2009 | Carreno | |
| 7,614,512 | B2 | | 11/2009 | Nader | |
| D613,110 | S | * | 4/2010 | Lane et al. | D7/392.1 |
| D613,989 | S | | 4/2010 | Smith | |
| D614,440 | S | * | 4/2010 | Cresswell et al. | D7/392.1 |
| D620,754 | S | * | 8/2010 | Duke | D7/510 |
| D621,660 | S | | 8/2010 | Smiedt et al. | |
| 7,802,446 | B2 | | 9/2010 | Overgaard | |
| D625,561 | S | | 10/2010 | Ablo | |
| D626,838 | S | * | 11/2010 | Meyers et al. | D9/443 |
| D640,093 | S | * | 6/2011 | Picozza et al. | D7/413 |
| D651,847 | S | * | 1/2012 | Gilbert | D7/392.1 |
| D652,256 | S | * | 1/2012 | Eyal | D7/510 |
| D653,081 | S | * | 1/2012 | George | D7/510 |
| D656,360 | S | * | 3/2012 | Miller et al. | D7/510 |
| D657,618 | S | * | 4/2012 | Wahl | D7/392.1 |
| D669,732 | S | * | 10/2012 | Hopkins et al. | D7/392.1 |

* cited by examiner

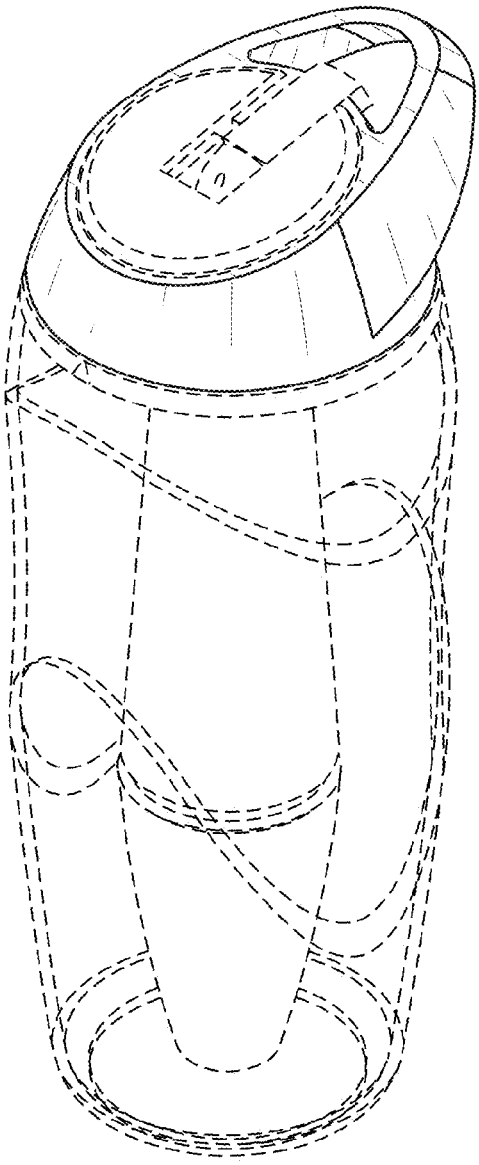
FIG. 13
(New)
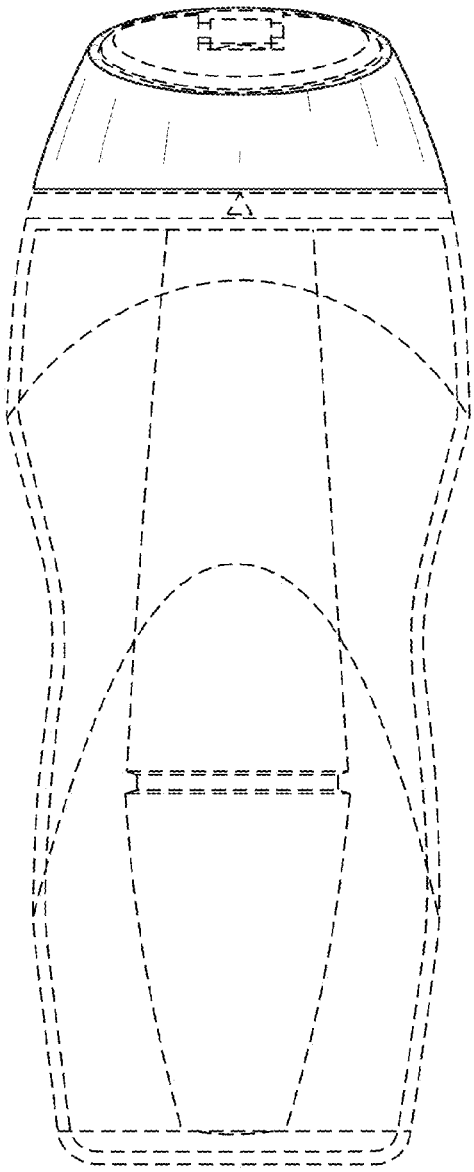
FIG. 14
(New)

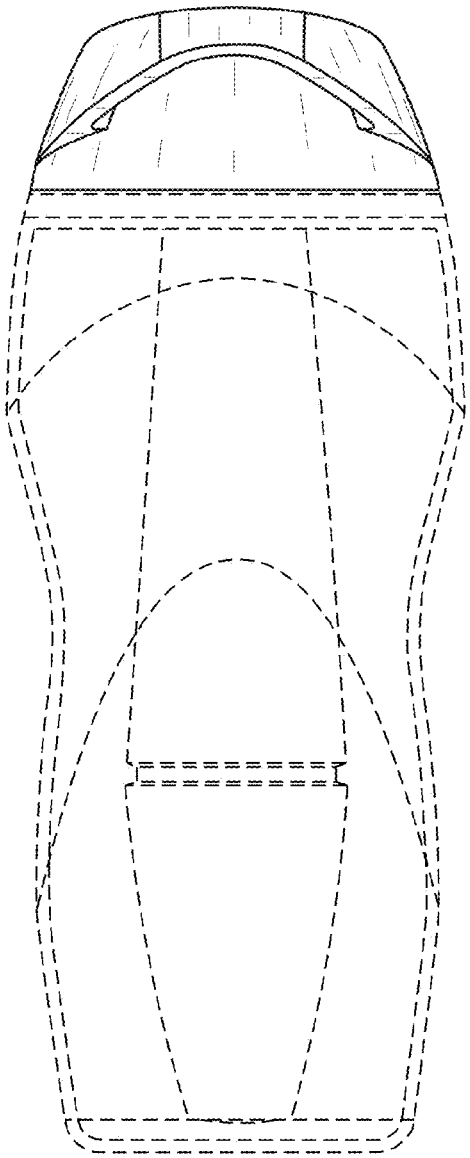
FIG. 15
(New)
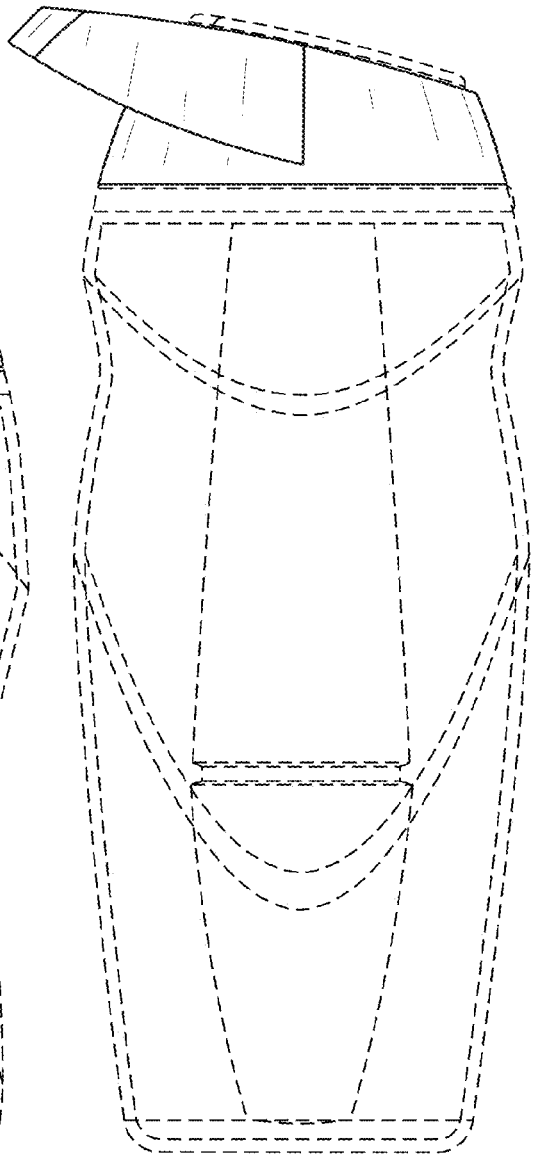
FIG. 16
(New)

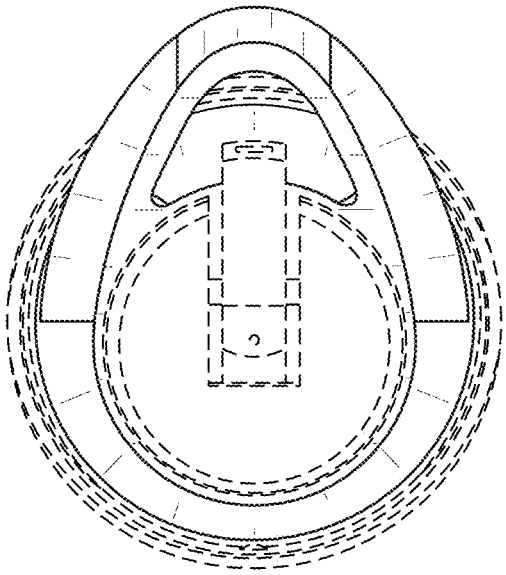
FIG. 17
(New)
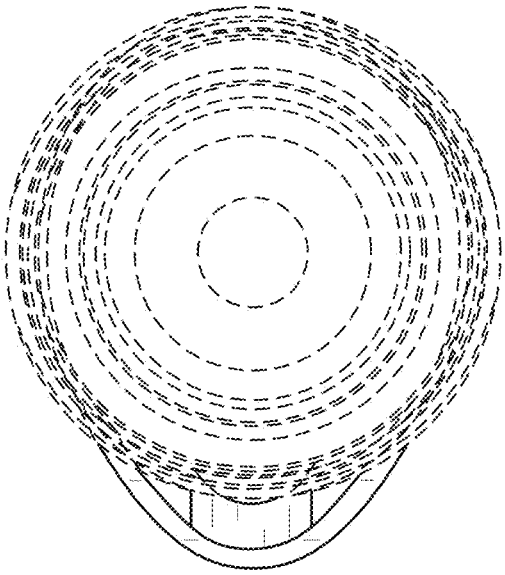
FIG. 18
(New)